US005535279A

United States Patent [19]
Seestrom

[11] Patent Number: 5,535,279
[45] Date of Patent: Jul. 9, 1996

[54] POSTAGE ACCOUNTING SYSTEM INCLUDING MEANS FOR TRANSMITTING A BIT-MAPPED IMAGE OF VARIABLE INFORMATION FOR DRIVING AN EXTERNAL PRINTER

[75] Inventor: Frank E. Seestrom, Weston, Conn.

[73] Assignee: Pitney Bowes Inc., Stamford, Conn.

[21] Appl. No.: 356,747

[22] Filed: Dec. 15, 1994

[51] Int. Cl.[6] .......... G06F 15/20
[52] U.S. Cl. .......... 380/55; 380/51
[58] Field of Search .......... 380/51, 55

[56] References Cited

U.S. PATENT DOCUMENTS

| | | | |
|---|---|---|---|
| 4,831,555 | 5/1989 | Sansone et al. | 380/51 |
| 4,949,381 | 8/1990 | Pastor | 380/51 |
| 5,121,432 | 6/1992 | Gilham et al. | 380/51 |
| 5,293,465 | 3/1994 | Abumehdi et al. | 380/51 X |
| 5,375,172 | 12/1994 | Chrosny | 380/51 |
| 5,390,251 | 2/1995 | Pastor | 380/51 X |

*Primary Examiner*—Gilberto Barrón, Jr.
*Attorney, Agent, or Firm*—Charles R. Malandra, Jr.; David E. Pitchenik; Melvin J. Scolnick

[57] ABSTRACT

A postage accounting system comprising: structure means for accounting for postage; printing structure externally of the accounting structure, the printing structure including a printing module and a computer for controlling the printing module, the printing module including printing apparatus and structure for sequentially feeding each item of a predetermined plurality thereof to the printing apparatus for printing thereon, the computer programmed for sequentially transmitting variable information for each item to the accounting structure, the variable information including at least a portion of the mailing address for each item; the postage accounting structure including structure for connecting the accounting module in communication with the printing structure, the accounting structure including structure for sequentially encrypting the variable information received for each item, the accounting structure including a microprocessor, the microprocessor programmed for transmitting a bit-mapped image of fixed information to the printing means for printing on each item, and the microprocessor programmed for separately sequentially transmitting a bit-mapped image of the encrypted information for each item to the printing structure for printing thereon.

9 Claims, 3 Drawing Sheets

POSTAGE ACCOUNTING SYSTEM INCLUDING MEANS FOR TRANSMITTING A BIT-MAPPED IMAGE OF VARIABLE INFORMATION FOR DRIVING AN EXTERNAL PRINTER

BACKGROUND OF THE INVENTION

This invention is generally concerned with a postage accounting system and more particularly with a postage accounting system including structure for transmitting a bit-mapped image of variable information for driving an external printer.

This patent application is one of the following three, concurrently filed, related, patent applications assigned to the same assignee: U.S patent application Ser. No. 08/356,747 for a Postage Accounting System Including Means For Transmitting A Bit-Mapped Image Of Variable Information For Driving An External Printer, filed by Seestrom (Attorney Docket No. E-306); U.S. patent application Ser. No. 08/356,749 for a Postage Accounting System Including Means For Transmitting ASCII Encoded Variable Information For Driving An External Printer, filed by Ramadei (Attorney Docket No. E-307); and U.S. patent application Ser. No. 08/356,748 for a Postage Metering System With Dedicated and Non-Dedicated Postage Printing Means, filed by Seestrom (Attorney Docket No. E-308).

Various data processing systems have been developed. Examples of such systems are disclosed in: U.S. Pat. No. 4,278,359 for a Control Circuit For Use With A Dot Matrix Printer, filed by Weikel and issued Jul. 14, 1981; U.S. Pat. No. 4,737,924 for a Dot Matrix Type Serial Printer filed, by Miki and issued Apr. 12,1988; U.S. Patent No. 4,746,941 for a Dot Printer With Token Bit Selection Of Data Latching, filed by Pham et. al. and issued May 24, 1988; U.S. Pat. No. 4,917,010 for a Franking Machine With Variable And Fixed Thermal Printhead, filed by Gilham, et al., and issued Apr. 17, 1990; U.S. Pat. No. 4,979,131 for Printer Apparatus, filed by Suzuki and issued Dec. 18, 1990; U.S. Pat. No. 5,140,675 for Printer Controller Apparatus Interfacing With External Data Sources, filed by Okada and issued Aug. 18, 1992; and, U.S. Pat. No. 5,325,469 for a Graphic Emulation Method In A Printer, filed by Ro and issued Jun. 28, 1994.

The most pertinent of the aforesaid references are: U.S. Pat. No. 4,917,010, which discloses a thermal printer for independently printing fixed and variable information utilizing different printheads at a single printing station; U.S. Pat. No. 4,979,131, which discloses printing apparatus including a memory for storing a printing pattern, structure for changing the printing pattern in response to externally supplied data, and a printhead for printing the changed pattern; U.S. Pat. No. 5,140,675, which discloses a printer unit having a data processor connected thereto for processing internal data and data received from multiple sources for driving the printer unit; and, U.S. Pat. No. 5,325,469, which discloses structure for changing the data content of a graphic image stored in a dot matrix printer.

However, the references are silent concerning the provision of a system which includes postage accounting structure having a communications interface, for receiving plain text versions of mailing addresses from an external source thereof, for transmitting fixed postage indicia information once to a separate printer for sequentially printing on each item, including a label or letter, of a plurality thereof which are to be sequentially processed by the printer, and for separately sequentially transmitting AA bit-mapped image of encrypted variable postage indicia and addressing information to the printer for printing on the sequentially processed items.

Accordingly:

an object of the invention is to provide a postage accounting system including means for transmitting a bit-mapped image of variable information to an external printer;

another object is to provide postage accounting structure including a communications interface connected for receiving plain text versions of mailing addresses from a source thereof, means for transmitting a bit-mapped image of fixed postage indicia information to a separate printer, once for a plurality items, including labels or letters, for sequentially printing thereon, and means for sequentially transmitting respective bit mapped images of encrypted variable information for sequentially printing on the respective items; and another object is to provide a postage value metering system which includes postage value accounting means having encryption structure and a communications interface, means connected to the interface for providing plain text versions of mailing addresses for a plurality of items, including labels or letters, and the accounting means including means for transmitting a fixed portion of a postage indicia once for successively printing on each of the plurality of letters, and the accounting means including means for sequentially transmitting encrypted versions of variable portions of the postage indicia for each item for sequentially printing on the respective items.

SUMMARY OF THE INVENTION

A postage accounting system comprising: means for accounting for postage; printing means externally of the accounting means, the printing means including a printing module and computer means for controlling the printing module, the printing module including printing apparatus and means for sequentially feeding each item of a predetermined plurality thereof to the printing apparatus for printing thereon, the computer means including means programmed for sequentially transmitting variable information for each item to the accounting means, the variable information including at least a portion of the mailing address for each item; the postage accounting means including means for connecting the accounting module in communication with the printing means, the accounting means including means for sequentially encrypting the variable information received for each item, the accounting means including a microprocessor, the microprocessor including means programmed for transmitting a bit-mapped image of fixed information to the printing means for printing on each item, and the microprocessor including means programmed for separately sequentially transmitting a bit-mapped image of the encrypted information for each item to the printing means for printing thereon.

BRIEF DESCRIPTION OF THE DRAWINGS

As shown in the drawings, wherein like reference characters designate like or corresponding parts throughout the several views.

DESCRIPTION OF THE PREFERRED EMBODIMENTS

Figure 1:
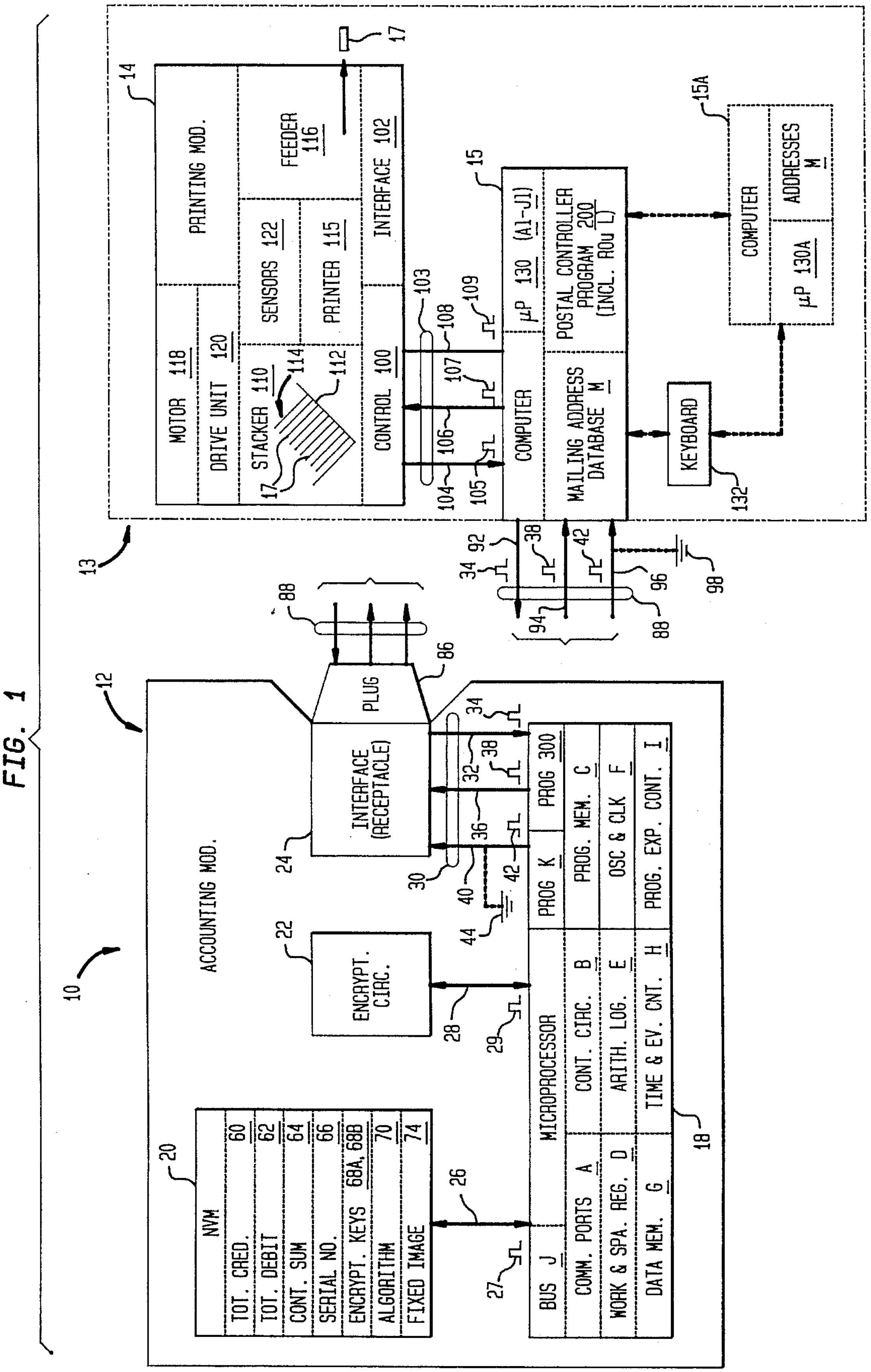
FIG. 1 is a schematic view of a value metering system according to the invention, including a secure value accounting module adapted to be connected to a non-secure printing system physically separated from the accounting module.

As shown in FIG. 1, a postage accounting system 10 according to the invention preferably comprises a secure postage accounting computer module 12 which is adapted to be connected in communication with a printing system 13, including a non-secure printing module 14 and a non-secure local computer 15 therefor, physically separated from the accounting module 12 (FIG. 1), for providing verifiable encrypted information 16 (FIG. 2) for printing on items, including labels, and letters such as cards, envelopes or other letters, represented by the envelope 17.

The postage accounting computer module 12 (FIG. 1) generally includes a conventional microprocessor 18, and suitable non-volatile memory (NVM), encryption and interface structures, respectively designated 20, 22 and 24, which are conventionally connected to the microprocessor 18 and operable under the control thereof.

The microprocessor 18 (FIG. 1) may be any commercially available microprocessor having a sufficient number of communications ports "A" which are either already available or are programmable for serial, parallel or asynchronous communications, as the case may be, to provide a separate external communications links for respective components, such as the printing system 13, which are externally connected to the accounting module 10 for communication therewith. Of course, without departing from the spirit and scope of the invention, the microprocessor 18 may include a plurality of microprocessors 18 to provide for additional communication ports "A" and other added capacities which may be called for in the course of implementation of the invention. Moreover, the microprocessor 18 generally includes a plurality of control circuits "B", a program memory "C", a plurality of working and spare registers "D", an arithmetic logic unit "E", circuits for one or more oscillators and clocks "F", data memory "G", timers and event counters "H" and program expansion control "I", and an internal communications bus "J". Further, the microprocessor 18 includes an application program 300 for controlling the various operations of the accounting module 12 discussed herein.

The non-volatile memory structure (NVM) 20 (FIG. 1) is suitably electrically connected to the microprocessor 18 by means of a conventional communications link 26, extending from the microprocessor bus "J", for transmitting and receiving data signals, such as the signal 27, and synchronizing communications between the microprocessor 18 and NVM 20. In addition, the encryption structure 22 is suitably electrically connected to the microprocessor 18 by means of a conventional communications link 28, extending from the microprocessor bus "J", for transmitting and receiving data signals, such as the signal 29, and synchronizing communications between the microprocessor 18 and encryption structure 22. Moreover, the interface structure 24 is suitably electrically connected to the microprocessor 18 by means of a serial, parallel or asynchronous communications link, represented by the serial communications link 30, which includes a data input lead 32, for receiving data signals, such the signal 34, from the printing system 13 for the microprocessor 18, a data output lead 36, for providing data signals, such as the signal 38, from the microprocessor 18 to the printing system 13, and a clock lead 40, for providing clock signals, such as the signal 42, from the microprocessor 18 to the printing system 13 for synchronizing communications therebetween. Of course, assuming the provision of an asynchronous communications link 30, the lead 40 would be connected to the sink 44 of the addressing module 12.

The NVM 20 (FIG. 1) may be any commercially available non-volatile memory of the type which is suitable for use in a conventional postage meter for storing data which is critical to the operation of the meter and to guard against data access by the User and data losses due to power failures. Accordingly, the non-volatile memory (NVM) 20 preferably has sufficient capacity for storing data corresponding to a current total credit value 60, which is a total value postage currently available for printing, a current total debit value 62, which is the total of all increments of postage 72 which have been decremented from total credit values 60, a control sum 64, which is the sum of the aforesaid values 60 and 62, and a serial number 66 of the accounting module 12. Moreover, the NVM 20 preferably includes sufficient capacity for storing one or more first encryption keys 68A, which may be utilized in an algorithm 70 for changing the total credit and debit values, 60 and 62, under the control of the microprocessor 18. Preferably, the algorithm 70 is also stored in the NVM 20 and is normally implemented under the control of the microprocessor 18 for changing the total credit and debit values, 60 and 62, by decrementing the credit value 60 and incrementing the debit value 62 by an amount which is equal to a current increment of postage 72 (FIG. 2) which is to be printed by the printing module 14 (FIG. 1). Still further, the NVM 20 preferably has sufficient capacity for storing data corresponding to the fixed image portion 74 of a postage indicia 76 (FIG. 2), including, for example, a graphic image 74 of an eagle 78, town circle 80, value box 82 and the current date 84.

The encryption structure 22 (FIG. 1) is preferably conventionally operable under the control of the microprocessor 18 for encrypting at least alphanumeric data, and, optionally, both alphanumeric and graphic data, to provide verifiable encrypted information 16 (FIG. 2) for printing by the printing module 14. Thus the encryption structure 22 is operable under the control of the microprocessor 18 for encrypting data corresponding to, for example, at least one or more of the numerical values stored in the NVM 20, including the current date, successive current increments of postage values 72 (FIG. 2) and at least a portion of the data corresponding to respective mailing addresses 86, such as the zip code of the respective addressees, and, optionally, in addition thereto, data corresponding to the graphic image 74, aside from the current date, stored in the NVM 20 (FIG. 1). To that end, the NVM 20 additionally has stored therein one or more second encryption keys 68B for use by the encryption structure 22. Without departing from the spirit and scope of the invention, the encryption structure 22 may be a suitable electrical circuit which is located externally of the microprocessor 18, or a conventional program "K" which is stored in the microprocessor 18, and operable under the control thereof. As noted above the encrypted information 16 printed on the envelope 17 is characterized as being "verifiable". In this connection it is noted that assuming the Postal Service has a computer having stored therein the program "K" and encryption keys 68, then, the plain text alphanumeric and graphic information on the face of the envelope 17 which is encrypted by the microprocessor 18 may be read from the envelope 17 and encrypted by the Postal Service computer to produce encrypted information which may be compared to the encrypted information 16 printed on the envelope 17, in order to verify that they are the same, whereby the relationship between the selected plain text and encrypted versions thereof which are printed on the envelope 17 may be authenticated.

The interface structure 24 (FIG. 1) is preferably a conventional electrical receptacle, which is constructed and arranged for receiving an electrical plug 86 of a communications link 88 from the control structure 15 of the printing system 13. The communications link 88 includes a data output lead 92, for providing data signals, such the signal 34, to the microprocessor 18, a data input lead 94, for receiving data signals, such as the signal 36, from the microprocessor 18 and a clock lead 96, for receiving clock signals, such as the signal 42, from the microprocessor 18 for synchronizing communications between the microprocessor 18 and printing system 13. Of course, assuming the provision of an asynchronous communications link 30 at the accounting module 12, the lead 96 would be connected to the sink 98 of the printing system 13.

The printing module 14 (FIG. 1) is preferably a conventional, standalone, device, which includes suitable structure 100, such as a microprocessor, for controlling the various structures and functions of the printing module 14. The printing module 14 may include a conventional operator interface 102, such as a suitable keyboard, which is conventionally coupled to the control structure 100 for operation thereof in response to input signals from the keyboard. Whether or not the printing module 14 includes an operator interface 102, the control structure 100 is preferably conventionally adapted to include a two-way serial or parallel communications link, represented by the serial communications link 103, for conventionally coupling the control structure 100 to an external source, such as the local computer 15. The communications link 103 includes a data output lead 104, for providing data signals, such the signal 105, to the local computer 15, a data input lead 106, for receiving data signals, such as the signal 107, from the local computer 15 and a clock lead 108, for receiving clock signals, such as the signal 109, from the local computer 15 for synchronizing communications between the local computer 15 and printing module 14. Thus the printing module 14 is preferably adapted to permit control of the structures and functions thereof from the local computer 15 rather than from the operator interface 102.

The printing module 14 (FIG. 1) additionally includes conventional sheet stacking structure 110, such as a suitable hopper 112 into which a stack 114 of items 17, including labels or letters, may be loaded. The printing module 14 also includes conventional printing apparatus 115, such as any conventional thermal, ink jet, laser or like commercially available printing apparatus to which items 17 are fed from the hopper 112 for printing at least alphanumeric information, and, preferably, both alphanumeric and graphic information. In addition, the printing module 14 includes conventional sheet feeding structure 116 which is suitably electrically connected to and operable under the control of the control structure 100 for sequentially feeding items 17 from the stack 114. The feeding structure 116 may be any conventional vacuum or roller type structure for engaging the top or bottom item 17 in the stack 114 and sequentially feeding respective items 17 from the hopper 112 to the printing apparatus 115 and, after printing, sequentially feeding the items 17 from the printing module 14. Further, the printing module 14 includes a suitable motor 118, which is connected to an operable under the control of the control structure 100, and includes one or more drive units 120, which are respectively connected between the motor 118 and feeding structure 116. Moreover, the printing module 14 may include a plurality of conventional sensors 122 for sensing various positions of respective items 17 and of selected elements of the feeding structure 116, motor 118 and drive units 120, including their respective home positions, at selected time intervals. The sensors 122 are conventionally electrically connected to the control structure 100 for providing analog signals thereto. And the control structure 100 is conventionally constructed arranged, for example as by programming in the case of the control structure 100 being a microprocessor, for providing digital signals, such as the signal 105, to the local computer 15 which correspond to the various positions of respective items 17, and to the respective positions of the selected elements of the feeding structure 116, motor 118 and drive units 120, at selected time intervals.

Figure 2:
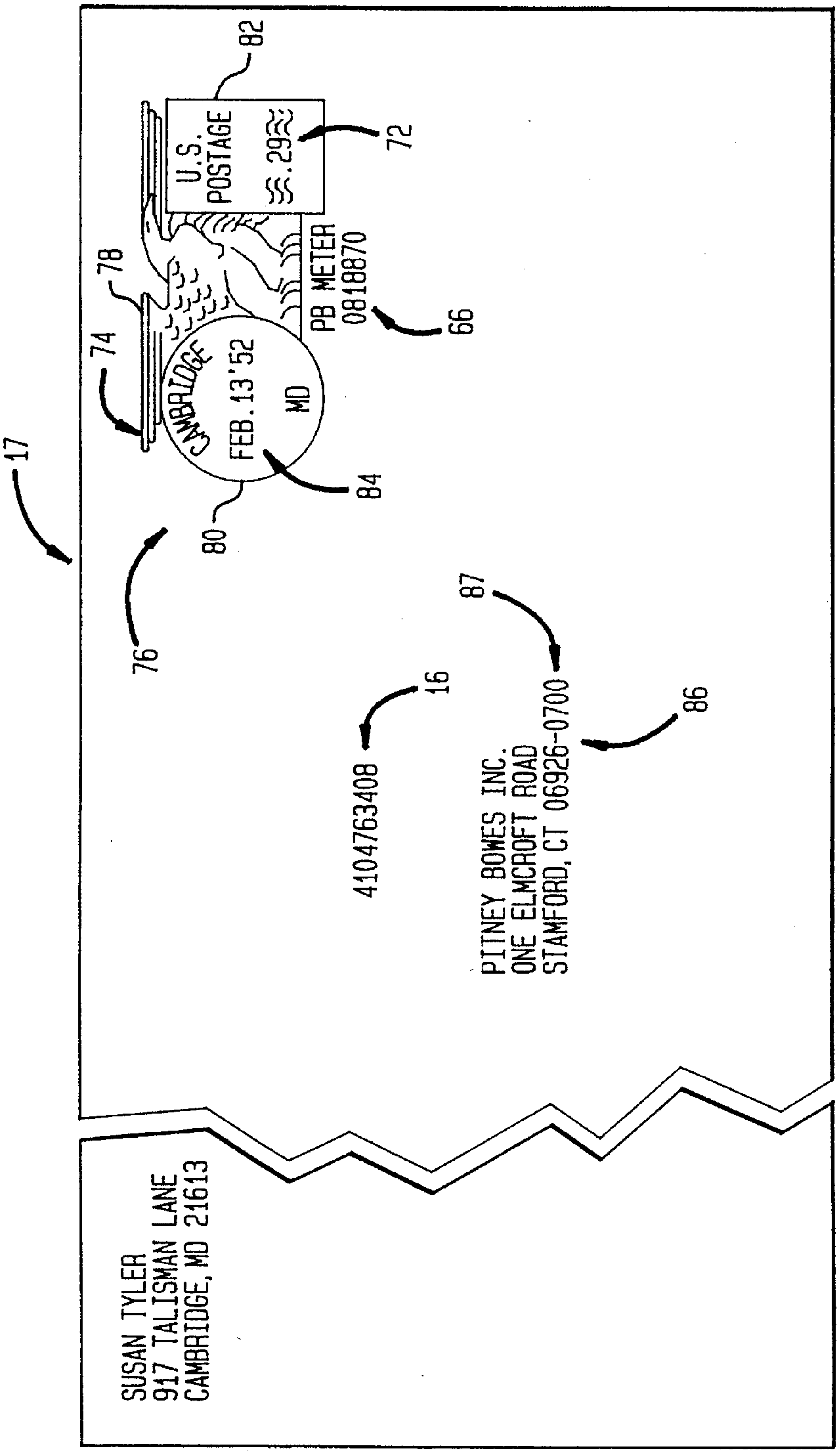
FIG. 2 is an elevation of an envelope having printed thereon a verifiable postage indicia printed by the non-secure printing system in accordance with encrypted information received from the secure accounting module.

The local computer 15 (FIG. 1) is preferably any conventional, commercially available, computer, such as a conventional controller or personal computer. The local computer 15 preferably comprises a microprocessor 130, which includes a plurality of circuits, stored data and programs, A1–J1 inclusive, which respectively correspond in all respects to the circuits, stored data and programs, A–J inclusive, of the microprocessor 18. In addition, the local computer 15 preferably has stored therein a mailing address database "M" and a postal controller program 200 including a conventional routine "L" for calling up and accessing respective mailing addresses 86 (FIG. 2). Further, without departing from the spirit and scope of the invention, rather than, or in addition to, the printing module 14 including control structure 100, the local computer 15 may include a keyboard 132 for manually entering information concerning respective mailruns into the printing system 13 under the control of the microprocessor 130. Moreover, without departing from the spirit and scope of the invention, the local computer 15 may be a first computer 15, and the printing system 13 may include a second computer 15A which is conventionally connected in communication with the first computer 15, but wherein the second computer 15A, rather than the first computer 15, includes the mailing address database "M" and keyboard 132 and does not include the postal controller program 200, whereby the first computer 15 is a module including the microprocessor 130 having stored therein the postal controller program 200.

Figure 3:
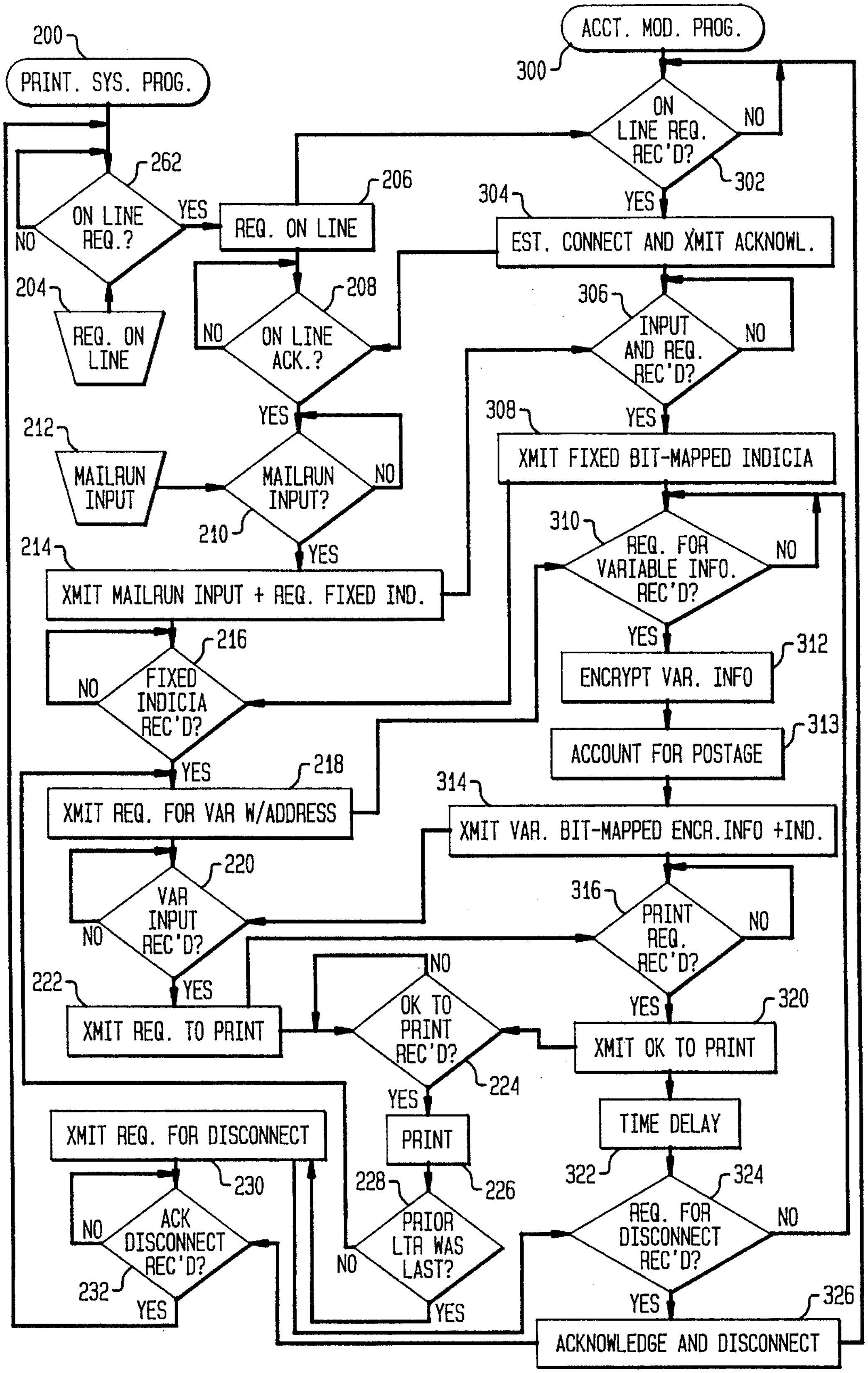
FIG. 3 is a flow chart of the process implemented by the accounting module and printing system for causing the printing system to print the verifiable encrypted information.

Assuming energization of the accounting module 12 (FIG. 1) and printing system 13, and initialization of the microprocessor 18, computer 15 and various components of the printing module 14, the printing system program 200 (FIG. 3) initially implements the step 202 of inquiring whether a manually input request, 204, has been received, step 202, to establish a semi-permanent, i.e., "on-line", communication connection with the accounting module 12. And, assuming an on-line request has not been received, step 202, then, the program 200 continuously loops through step 202 until the on-line request 204 is received, step 202. Whereupon, the program 200 implements the step 206 of requesting that the accounting module 12 establish an on line communication connection with the printing system 13, followed by the step 208 of inquiring whether an acknowledgment of establishment of the on-line connection has been received from the accounting module 12, failing which, the program 200 continuously loops through step 208 until the acknowledgment is received. On the other hand, the accounting module program 300 initially implements the step 302 of inquiring whether an on-line request, 206, has been received, step 302, from the printing system 13, and, assuming that it has not, step 302, then, the program 300 continuously loops through step 302, until the request 206 is received, step 302. Whereupon, the program 300 causes the computer 15 to implement the step 304 of establishing the on-line connection and transmitting the acknowledgment thereof to the accounting module 12.

Thereafter, the printing system program 200 (FIG. 3) implements the step 210 of inquiring whether information pertaining to a mailrun, including the total number of items, including labels or letters, 17 which are to be processed, together with a request for the fixed image portion of the postage indicia, has been manually entered into the printing system computer 15 or 15A, as the case may be. And, assuming such mailrun information and the fixed image request, 212, has not been received, step 210, then, the program 200 continuously loops through step 210 until the mailrun information and fixed image request 212 is received, step 210. Whereupon, the program 200 implements the step 214 of transmitting the mailrun information and request for the fixed image portion of the indicia to the accounting module 12, followed by the step 216 of inquiring whether the fixed image portion has been received from the accounting module 12, failing which, the program 200 continuously loops through step 216 until the fixed image portion is received. On the other hand, following step 304, the accounting module program 300 implements the step 306 of inquiring whether the mailrun information and request for the fixed image portion of the indicia 214 has been received from the printing system 13, and, assuming that it has not, step 306, then, the program 300 continuously loops through step 306, until the mailrun information and fixed indicia request 214 is received, step 306. Whereupon, the program 300 causes the microprocessor 18 to implement the step 308 of transmitting a bit-mapped image of the fixed portion of the indicia to the printing system 13, for sequential use thereby in the course of sequentially processing each of the items 17 of the mailrun.

Following implementation of step 216 (FIG. 3), the printing system program 200 implements the step 218 of transmitting to the accounting module 12 a request for the variable portion the postage indicia, including the postage value 72 which is to be printed together with at least a selected portion of the mailing address, such as, and preferably, the nine digit zip code 87 of the mailing address 86 which is to be printed on the first item 17 of the mailrun, followed by the step 220 of inquiring whether the requested postage indicia for the particular mailing address has been received. And, assuming the postage indicia as requested in step 218 is not received, step 220, then, the program 200 continuously loops through step 220 until it is received for the particular item 17. On the other hand, following step 308, the accounting module program 300 causes the microprocessor 18 to implement the step 310 of inquiring whether the printing system 13 has transmitted the request, step 218, for the postage indicia accompanied by the selected portion or all of the mailing address, for the first item 17 of the mailrun, and, assuming that it has not, then, the program 300 continuously loops through step 310 until the request for the particular addressee has been received. However, upon receiving the request for postage indicia accompanied by the selected portion or all of the mailing address, step 310, then, the accounting module program 300 causes the microprocessor 18 to implement the step 312 of generating the encrypted information 16 (FIG. 2) for printing on the first item of the mailrun, by encrypting the plain text version of the variable portion of the postage indicia which is to be printed, including at least the postage value 72, and encrypting information included in the mailing address 86, and merging such encrypted indicia and address information to form the encrypted information 16. Thereafter, the accounting module program 300 causes the microprocessor 18 to implement the step 313 of accounting for the current increment of postage value 72 which is to be printed, followed by the step 314 of transmitting a bit-mapped image of the encrypted information 16 and plain text postage value 72 to the printing module 13 for printing thereby. Accordingly, the printing system 13 does not receive, and thus cannot print, respective increments of postage values 72 without the accounting module 12 not having previously decremented the total credit value 60 and incremented the total debit value 62, stored in the NVM 20, by respective amounts corresponding to the respective increments of postage values 72 which are to be printed. Moreover, the item 17 will have printed thereon encrypted information 16 in which there is embedded an encrypted version of the variable postage value 72 and an encrypted version of information included in the mailing address of the item 17 on which the plain text versions of the postage indicia 74 and mailing address 86 are also printed.

When the requested variable portion of the postage indicia is received, step 220 (FIG. 3), the printing system program 200 causes the computer 15 to implement the step 222 of transmitting a request to the accounting module 12 to print the postage indicia, followed by implementing the step 224 of inquiring whether permission to print has been received from the accounting module 12. And, until permission to print is received from the accounting module 12, the program 200 causes the computer 15 to continuously loop through step 224. On the other hand, following step 314, the accounting module program 300 causes the microprocessor 18 to implement the step 316 of inquiring whether a request to print, step 222, has been received from the accounting module 12, failing which, the program 300 causes the microprocessor 18 to continuously loop through step 316 until the request to print is received, step 316. And, when the request to print is received, step 316, the accounting module program 300 causes the microprocessor 18 to implement the step 320 of transmitting a permission-to-print message to the printing module 13.

Upon receiving the permission-to-print message, step 224 (FIG. 3), the printing system program 200 implements the step 226 of causing the computer 15 to conventionally operate the printing module 14 for causing the sheet feeding structure 116 to feed the first item 17 from the stack 114 to the printing structure 115, causing the printing structure 115 to print the fixed and variable portions of the postage indicia 76 and the encrypted information 16 on the first item 17, and then causing the feeding structure 116 to feed the first item 17 from the printing module 14. Thereafter, the printing system program 200, implements the step 228 of inquiring whether the prior item, for example, the first label or letter 17 was the last item 17 of the mailrun. Assuming the answer to the inquiry of step 228 is negative, then, the program 200 returns processing to step 218. Thereafter, the printing module program 200 causes the computer 15 to continuously sequentially implement steps 218 through 228, inclusive, for causing the printing module 13 to sequentially process each of the items 17, until the inquiry of step 228 is answered affirmatively. Whereupon the printing system program 200 implements the step 230 of causing the computer 15 transmit a request to the accounting module 12 to disconnect the on-line communication connection with the printing system 13, followed by the step 232 of inquiring whether the acknowledgment of the request has been received. On the other hand, following implementation of step 320, the accounting module program 300 implements step 322, of delaying processing by the accounting module program 300 for a time interval which is sufficient to allow for the printing system program 200 reasonably to complete implementation of steps 226 and 228, thereby allowing for the printing system 13 to print the postage indicia and encrypted information on the item and allow for the inquiry of step 228 to be either negatively of affirmatively answered. And, at the end of the time delay, step 322, the accounting module program 300 implements the step 324 of inquiring whether a request for disconnecting the on-line connection has been received by the accounting module 12. Assuming the inquiry of step 324 is negatively answered, then the accounting module program 300 returns processing to step 310. Thereafter, the accounting module program 300 causes the microprocessor 18 to continuously sequentially implement steps 310 through 324, inclusive, for causing the accounting module 12 to sequentially transmit respective plain text versions of postage values together with associated encrypted information including the respective postage values, to the printing system 13, and to account for such postage values to be printed on each of the items 17 which are to be sequentially processed by the printing module 13, until the inquiry of step 324 is answered affirmatively. Whereupon the accounting module program 300 implements the step 326 of causing the microprocessor 18 to transmit an acknowledgment to the printing system 13 of the disconnect request 230 received by the accounting module 12 at step 324. Thereafter, the printing system and accounting module programs 200 and 300, respectively return processing to steps 202 and 302, where the programs 200 and 300 again respectively continuously implements the step 202 and 302 of inquiring whether a request has been received to establish another semi-permanent, i.e., on-line, communication connection for processing the next mailrun.

What is claimed is:

1. A postage accounting system comprising:

(a) secure means for accounting for postage;

(b) non-secure printing means externally of the accounting means, the printing means including a printing module and computer means for controlling the printing module, the printing module including printing apparatus and means for sequentially feeding each item of a predetermined plurality thereof to the printing apparatus for printing thereon, the computer means including means programmed for sequentially transmitting variable information for each item to the accounting means, the variable information including at least a portion of a mailing address for each item;

(c), the postage accounting means including means for connecting the accounting module in communication with the printing means, the accounting means including means for sequentially encrypting the variable information received for each item, the accounting means including a microprocessor, the microprocessor including means programmed for transmitting a bit-mapped image of fixed information to the printing means for printing on each item, and the microprocessor including means programmed for separately sequentially transmitting a bit-mapped image of the encrypted information for each item to the printing means for printing thereon.

2. The postage accounting system according to claim 1, wherein the computer means includes means programmed for causing the printing apparatus to print on each item the encrypted information corresponding to the variable information, whereby the relationship between the variable information and corresponding encrypted information is verifiable.

3. The postage accounting system according to claim 1, wherein the computer means includes means programmed for transmitting a request to the accounting module for permission to print the fixed and encrypted information.

4. The postage accounting system according to claim 3, wherein the variable information includes a postage value, the microprocessor programmed for transmitting a permission-to-print message to the printing module, and the microprocessor including means programmed for debiting a credit value by an amount corresponding to the postage value prior to transmitting the permission-to-print message.

5. The postage accounting system according to claim 1, wherein the computer means includes means programmed for transmitting a request to the accounting module for the fixed information.

6. The accounting system according to claim 1, wherein the computer means includes means programmed for transmitting a request to the accounting module for establishing a semi-permanent communication connection therewith, and the connecting means semi-permanently connecting the accounting module with the computer means in response to the request therefor.

7. The accounting system according to claim 1, wherein the computer means include means programmed for transmitting mailrun information to the accounting module, and the mailrun information including at least a number corresponding to the predetermined plurality of items.

8. The accounting system according to claim 6, wherein the computer means includes means programmed for transmitting to the accounting module a request to disconnect the semi-permanent communication connection therewith, and the microprocessor including means programmed disconnecting the semi-permanent connection in response to the request therefor.

9. The accounting system according to claim 1, wherein the variable information includes a postage value, and the microprocessor programmed for debiting a credit value by an amount corresponding to the postage value prior to transmitting the bit-mapped image of the encrypted information to the printing means.

* * * * *